United States Patent [19]

Akins

[11] Patent Number: 5,201,498
[45] Date of Patent: Apr. 13, 1993

[54] FLEXIBLE FENCING SYSTEM
[76] Inventor: Edward A. Akins, Box 158, Winnipeg, Canada, R2H 3B4
[21] Appl. No.: 822,692
[22] Filed: Jan. 21, 1992
[51] Int. Cl.[5] ........................................... E04H 17/18
[52] U.S. Cl. ........................................ 256/26; 256/24; 119/20
[58] Field of Search ........................ 256/29, 28, 30, 25, 256/26, 24; 119/20

[56] References Cited
U.S. PATENT DOCUMENTS

| | | | |
|---|---|---|---|
| 60,357 | 12/1866 | Gerard | 256/25 |
| 4,208,037 | 6/1980 | Legal | 256/25 |
| 5,058,863 | 10/1991 | Maffet | 256/25 |

Primary Examiner—Andrew V. Kundrat
Attorney, Agent, or Firm—Adrian D. Battison; Stanley G. Ade; Murray E. Thrift

[57] ABSTRACT

A fencing system and a method for confining farm animals includes conventional rectangular fence panels having end posts and cross rails but the posts are connected by flexible elements of a type which allow the posts to flex apart when impacted by an excited animal. This prevents damage to the panel while maintaining the animal properly confined. Various examples of the flexible element are disclosed including an elastic band that is wrapped around the posts in a figure of 8 arrangement, a convoluted spring and an elastic block.

16 Claims, 4 Drawing Sheets

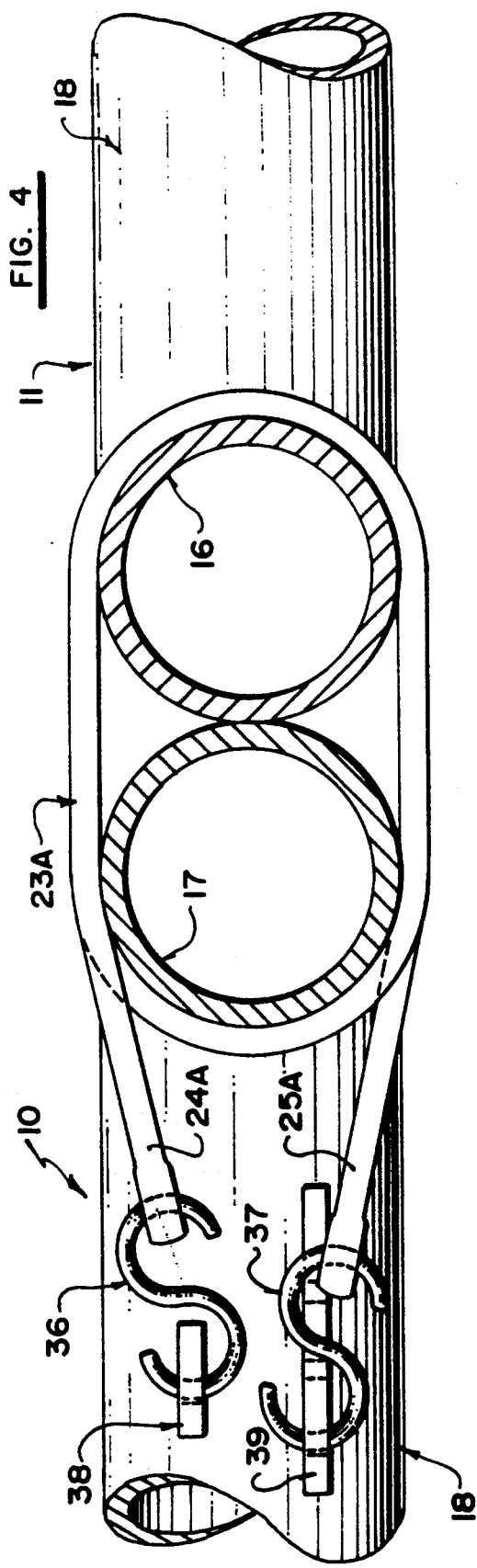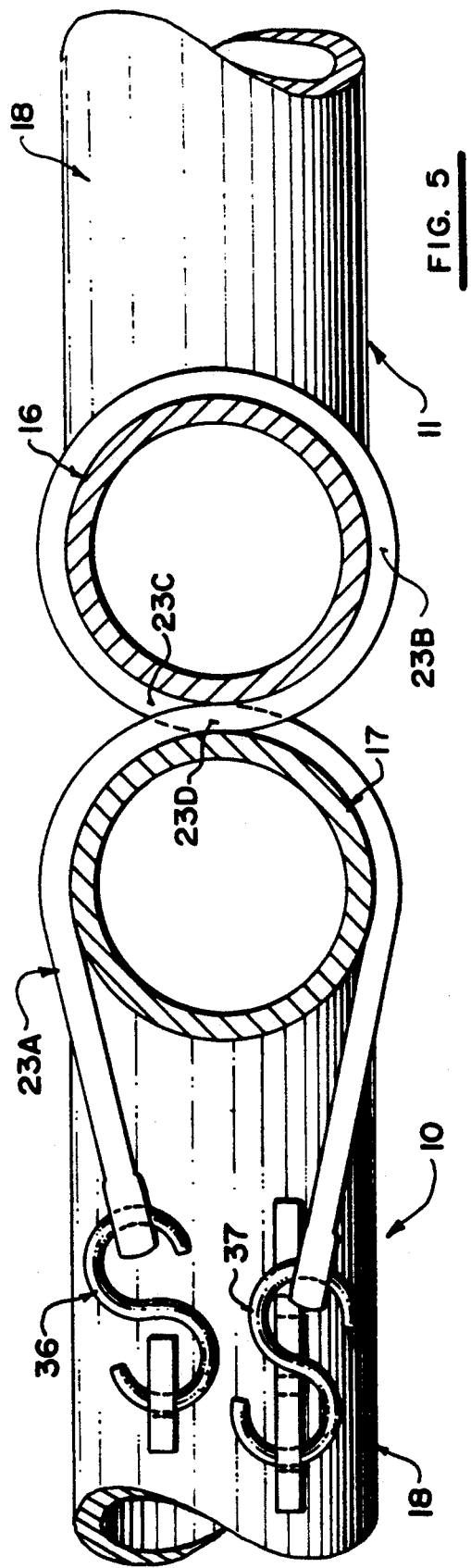

ns5,201,498

FLEXIBLE FENCING SYSTEM

This invention relates to a fencing system for confining animals.

In the ranching of cattle, it is often desirable to set up temporary pens to confine the cattle. Generally these pens are formed from separate fence panels which are then connected together to form a pen structure. Each panel generally comprises a pair of spaced vertical end posts and a plurality of horizontal cross rails. Each of the posts carries a part of a connector element for connecting that end post to the end post of a next adjacent panel. In many cases the connector comprises a vertical tubular portion which aligns with a corresponding tubular portion on the end post of the next adjacent panel for a simple rigid pin to be inserted through the aligned tubular portions to hold them in place against movement of one end post transversely relative to the next. In many cases one post has one such tubular element and the post of the next adjacent panel has two such tubular elements spaced apart to receive the first therebetween. The panel includes two such coupling elements one at the top and one at the bottom so that the posts are held parallel. The fence panels are then supported in vertical position by the cooperation with the next adjacent fence panel which is generally turned at right angles. In some cases the fence panel is connected to only one adjacent panel. In other cases multiple connector arrangements are provided for connecting together the end posts of three panels arranged mutually at right angles. This allows a second pen to be formed adjacent the first pen with one of the panels acting as a dividing panel between the pens.

Generally the posts are formed from tubular metal either of square or circular cross section and a horizontal cross rails are formed from similar material either welded to the posts or in some cases formed by bending the post at the top corner to integrally form the horizontal top rail.

The penning thus formed is generally used for cattle which when kept on free range are often fractious and determined to escape from the confinement. An animal thus weighing between 600 and 2,000 pounds if alarmed or wishing to escape can cause a severe impact with the fence panel either deliberately or because of the state of alarm.

Fence panels of this general type are strong and resistant to damage. However the main cause for failure of such panels is due to damage resulting from impacts with the animal. The fence panel thus must be replaced many times more frequently than would be the case simply if the fence panel deteriorated due to corrosion or other minor damage.

It is one object of the present invention, therefore, to provide an improved fencing system which enables fence panels of the above general type to be used in a system which significantly reduces replacement of the panels due to damage caused by impact with the animals.

According to a first aspect of the invention a fencing system for confining an animal comprising a plurality of fencing panels, each comprising an integral substantially rectangular rigid structure including a bottom, a top, a first end and a second end, means at the bottom for resting of the panel on the ground such that the top is supported at a height from the ground to confine the animal, means connecting one end of each panel to at least one next adjacent panel such that the panels are connected together with each providing support for the next to hold the panels vertical, said connecting means including elastically deformable means allowing flexible movement of said end relative to said at least one next adjacent panel.

According to a second aspect of the invention a fencing system for confining an animal comprising a fencing panel including a plurality of longitudinal rails and a plurality of posts fixed to the rails generally at right angles thereto to form a substantially rectangular rigid structure, and means for supporting the panel in a vertical plane to act as a confining panel for the animal, said supporting means including elastically deformable coupling means allowing flexible movement of the panel on impact therewith by the animal.

According to a third aspect of the invention a fence panel for use with other similar panels in confining one or more animals, comprising a first end post, a second end post parallel to the first end post, a plurality of parallel cross rails connecting the end posts and extending at right angles thereto, the posts and rails thus forming a rigid generally rectangular structure, and means adjacent said first end post arranged for connection to one end of a flexible coupling element for connection of the panel at said first end post to the next adjacent panel.

For the first time, therefore, the present applicant has provided a system in which the simple conventional fence panels formed by the well known technique of the welded posts and rails are modified by the use of an elastic coupling which enabled the coupling to flex when a panel is impacted by the animal thus reducing the stresses on the panel with a significantly reduced danger of damage to the panel. Of course this flexibility also can reduce the danger of injury to the animal.

Various techniques for providing the elastic coupling can be provided as described hereinafter.

Embodiments of the invention will not be described in conjunction with the accompanying drawings in which

BRIEF DESCRIPTION OF THE DRAWINGS

FIG. 4 is a similar cross sectional view of that of FIG. 3 showing a modified arrangement.

FIG. 5 is a cross sectional view similar to that of FIG. 3 showing a further modified arrangement.

DESCRIPTION OF THE DRAWINGS

Figure 1:
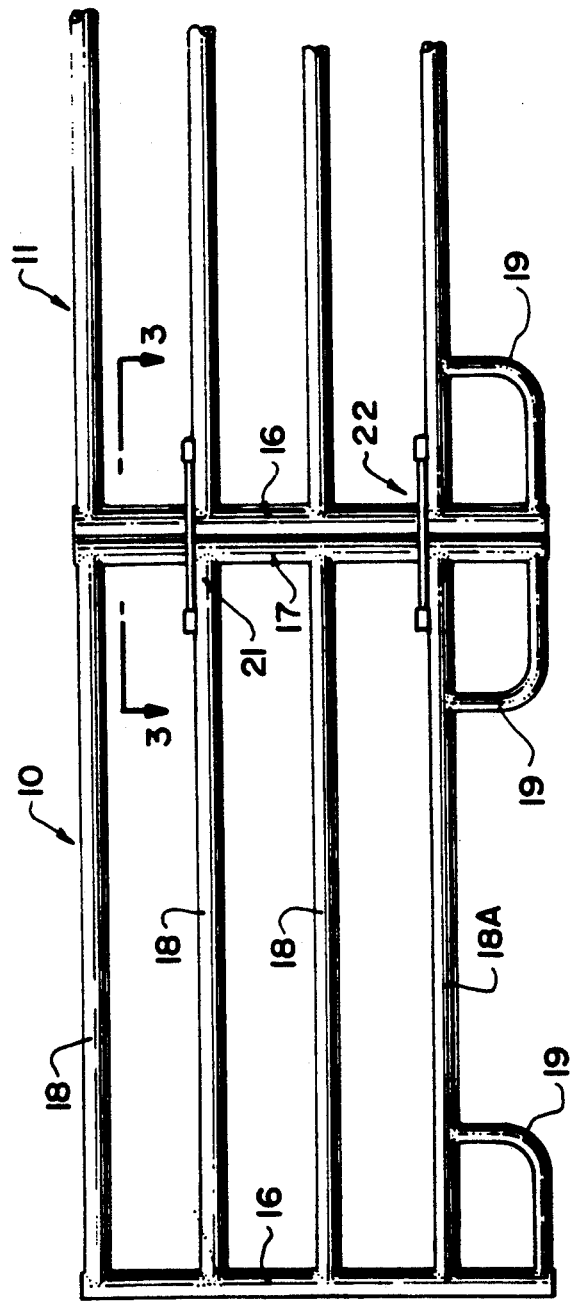
FIG. 1 is a front elevational view of a fencing system according to the present invention showing two panels connected together to form a temporary fence structure.

The fencing system comprises a plurality of fence panels 10, 11, 12, 13 and 14. Each fence panel comprises a first vertical post 16 at one end and a second vertical post at a second end. Posts are connected by a plurality of horizontal parallel rails 18 so as to form a rigid welded rectangular structure. A lowermost one of the horizontal rails indicated at 18A is spaced from the ground so that the base of the posts 16 and 17 projects beyond the lowest rail 18A into contact with the ground to support the panel standing upwardly from the ground. The height of the panel is sufficient such that with the post resting on the ground, the top rail is at a sufficient height to confine the animal concerned. At the bottom of the post 16 and 17 is provided a pair of bumpers 19 formed by a metal leg welded onto the base of the post and extending therefrom parallel to the bottom rail and then turned upwardly to engage the bottom rail and positioned part way along. This resists the tendency of a simple post to sink into soft ground.

The posts and rails are generally formed of the same tubular metal. In lightweight panels, this tubular metal can be one inch square tubing. In heavier duty panels, 1.5 inch or 2.0 inch circular tubing may be employed.

The fencing system as it is generally of a temporary nature intended for simple rapid erection and subsequent removal after the animals have been handled is formed without separate fixed posts so the support of the structure is obtained by locating fence panels at right angles so that each acts to provide a support to hold the next in the proper vertically upstanding position. Thus in FIG. 2, the panel 13 stands at right angles to the panels 10 and 14 and must provide support to hold those panels in vertical position. The panel 12 is also supported of course by the panel 13 which stands at right angles to the panel 12. The panels 10 and 11 lie in the same plane and hence the connection between the panel 10 and 11 provides no support. However it is intended (not shown) that the remote end of the panel 11 will be connected to a further panel at right angles thereto so that the panel 13 and the further panel provide sufficient support to hold the double span provided by the panel 10, 11 in the proper vertical orientation.

Thus each panel is connected to the next adjacent panel at the respective end post. Thus the end posts 17 of the panel 10 and 16 of the panel 11 are arranged in parallel abutting position and are connected by two separate connector elements schematically indicated in FIGS. 1 and 2 at 21 and 22 respectively. These connecting elements are positioned toward the top and toward the bottom of the panels so as to maintain the posts in the parallel vertical abutting or closely adjacent position.

In the conventional arrangement, the connecting elements are defined by rigid couplings often of the type including a rigid pin connecting together two sleeves each attached to a respective one of the posts. This provides a rigid connection between the panels so that the whole fence structure becomes rigid apart from the possibility for pivotal movement about a vertical axis defined by the pins. A modified construction of connection is shown in FIGS. 3, 4, 5, and 6 and will be described specifically hereinafter.

Figure 3:
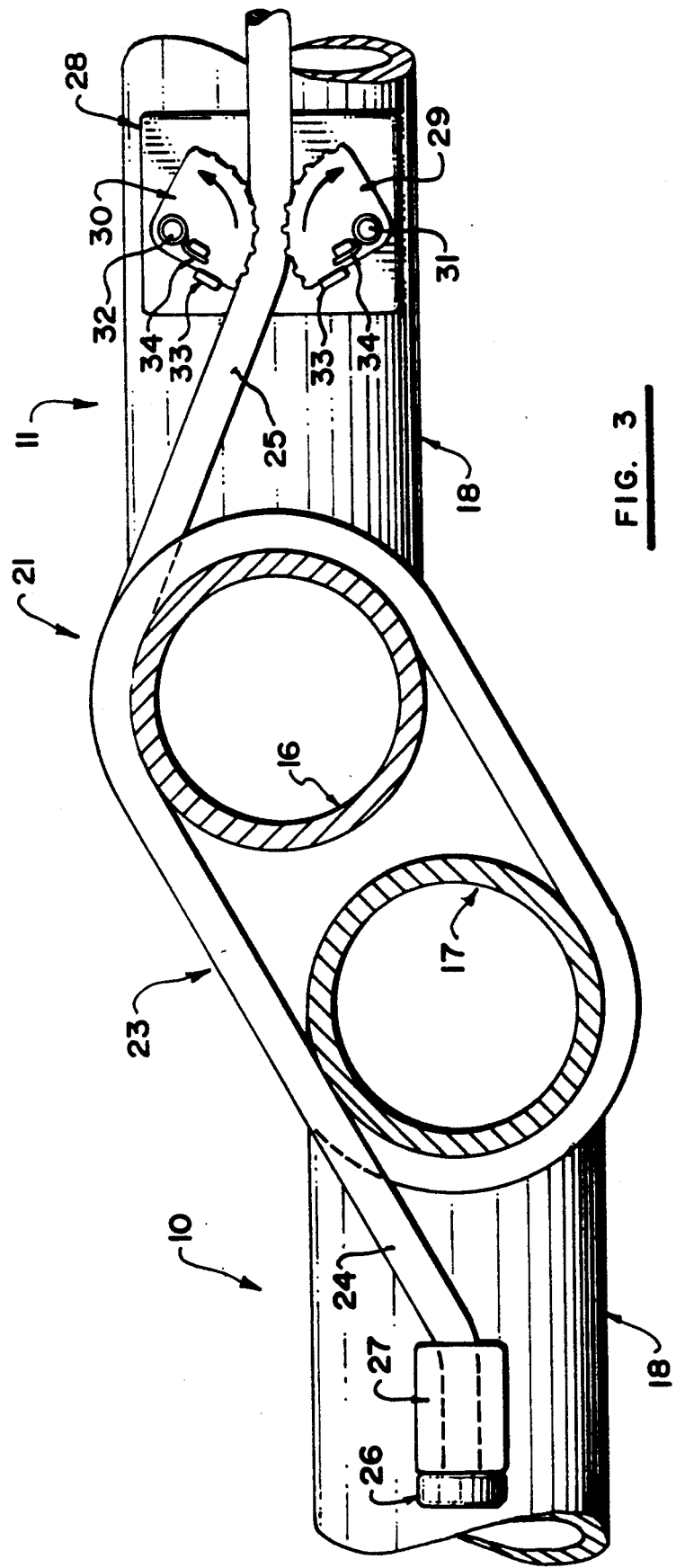
FIG. 3 is a cross sectional view along the lines 3—3 of FIG. 1.

Turning therefore firstly to FIG. 3, the posts are indicated at 17 and 16 and in FIG. 3 these are shown in a position in which the post 16 has been moved by an impact force applied to the panel 11. This allows the top part of the post 16 to move away rearwardly from the post 17 while the base of the post 16 remains aligned with the post 17 in view of the connection 22 and in view of the engagement of both of the posts with the ground.

The connecting element 21 comprises an elastic band 23 which has a first end 24 connected to the panel 10 and a second end 25 connected to the panel 11. The end 24 includes a molded end cap 26 which is of increased diameter relative to the generally cylindrical body of the band 24. The cylindrical body of the band 23 is of constant cross section and is attached to a rail 18 of the panel 10 by insertion of the body through a sleeve 27 welded on the upper side of the rail 18. The band 23 is thus threaded through the sleeve until the end cap 26 engages an end face of the sleeve thus holding the band in place.

The band is wrapped around the abutting posts 16 and 17 through 360° following which the outer end 25 is attached to a rail 18 of the panel 11. The attachment mechanism for the end 25 comprises a plate 28 welded on the upper face of the rail 18 with the plate carrying a pair of pivotal quadrants 29 and 30. Each of the quadrants is mounted on a respective pin 31, 32 for pivotal movement about a vertical axis. The quadrants are moveable from a pinched or latched position as shown to a release position. In the latch position shown, the quadrants engage against stop members 33 which hold the quadrants against movement further toward the post 16. An outer face of the quadrant is knarled to engage the elastic band. The quadrants are spring biased by a spring 34 into the pinched or latched position. This quadrant arrangement thus allows the end 25 of the band to be inserted into the space between the two quadrants and then can be pulled away from the post 16 to slide through the quadrants causing them to move in the direction of the arrows to release the band to move in the direction to tension the band. When released, however, the band pulls the quadrants back into the latched position and cannot thus move further towards the untensioning direction.

In operation, therefore, the band is carried normally upon the panel 10 and simply suspends from the rail 18. When it is required to connect the panel 10 to the next adjacent panel, the band is grasped, the posts are positioned in the required abutting position, the band is wrapped around the abutting posts and inserted into the latch and tensioned.

The wrapping can be applied through 360° or through a greater angle so as to provide a double or more wrap around the post.

Figure 2:
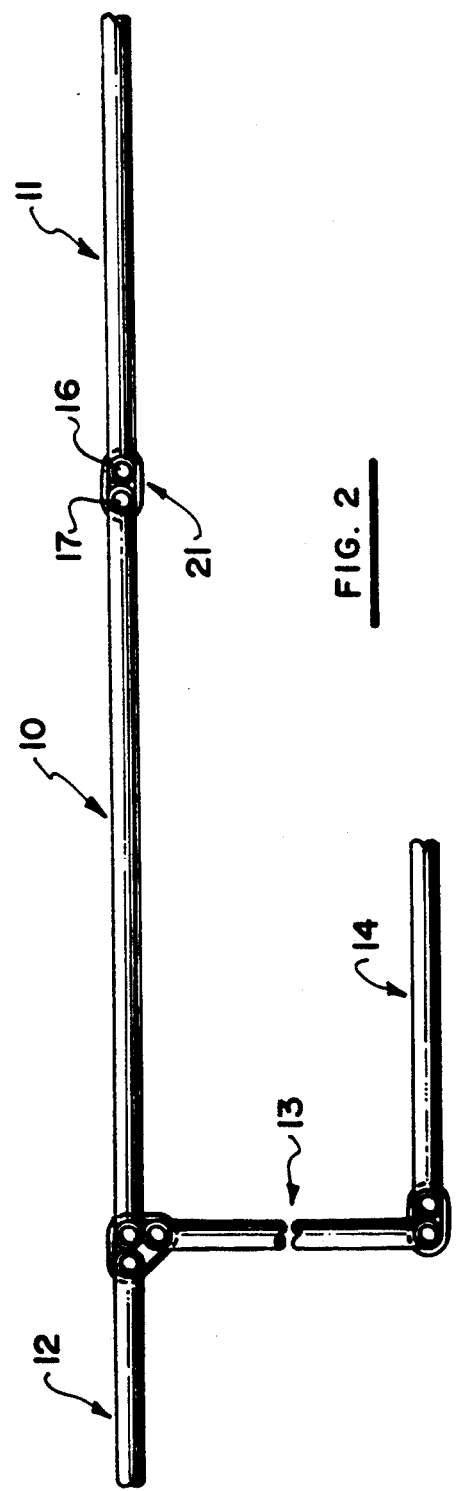
FIG. 2 is a top plan view of the fencing system of FIG. 1 showing a number of such panels connected together.

Normally the posts are held in the aligned position shown in FIGS. 2 and 4. However in the event of an impact by an animal on the panel, the panel can move as shown in FIG. 3 by a stretching of the elastic band. The amount of stretch is sufficient to prevent damage to the panel by the impact. The action of the band is to return the panel to its initial position due to the elastic stretch in the band. The panels are thus maintained substantially vertical by the elastic coupling but the elastic coupling allows sufficient flexibility to prevent the panels from being damaged by the sudden forces generated by an impact with a fractious animal.

An alternative arrangement is shown in FIG. 4 in which the band 23A is again wrapped around the posts 16 and 17. In this case, however, the band is wrapped sufficiently around the posts such that the ends 24A and 25A are both connected to the panel 10. In this case the ends include simple S hooks 36 and 37 which connect to upstanding lugs 38 and 39 on the rail 18. The lug 39 includes a plurality of openings defining a plurality of positions for the S hook 37 to increase or decrease the tension in the band.

In FIG. 5 is shown a modified arrangement for attachment of the end posts 17 and 16 of the panel 10 and 11 respectively. In this arrangement the structure is substantially identical to that shown in FIG. 4 including the elastic band or strap 23A and the S-hooks 36 and 37. In this embodiment, however, the elastic band 23A is wrapped around the end posts 16 and 17 substantially in a figure of eight configuration to form a loop 23B wrapped around the post 16 and two portions 23C and 23D passing between the posts 16 and 17 and thus holding the posts 16 and 17 elastically apart. It will be noted that the loop of the band does not pass wholly around the post 17 but instead extends to the S-hook which are connected to the rail 18.

This construction has the advantage that the posts 16 and 17 are held slightly apart by the portions 23C and 23D of the two separate bands, only one of which is shown in FIG. 5. Thus the posts are not abutting or rubbing against one another and the elastomeric material of the bands acts as a bearing surface to allow slight movement of one post relative to the next. In addition the loop configuration of the band acts to better locate the posts in an aligned position so they are less likely to twist from the proper common vertical plane and they are more likely to return to the common vertical plane after impact with the animal. However the band is sufficiently elastic in the relatively short portion between the posts to allow the necessary movement and the bands are sufficiently slippery to allow movement of the bands relative to the post to provide additional stretch where necessary.

The strap can be formed from any suitable elastic material which has sufficient strength and elasticity to provide the function set forth above. One example of a strap which would be suitable is that manufactured by UniRoyal Chemical and sold under the trademark "Vibrathane". The strap or band is indicated as being of cylindrical cross section but other cross sections may be used.

The arrangement described above provides the advantages as follows:

1. It reduces damage to the panel due to the sudden forces generated by an impact with the animal which can break welds and cause bending of the rails and posts. The flexibility of the strap is just sufficient to enable the flexing or stretching of the strap to take up the impact forces to reduce the possibility of damage to the panel itself.

2. The elastic band enables a simple and rapid hook up of one panel to the next panel since this can be done readily by simply wrapping each of the two straps individually around the posts and latching the strap in place. The simple strap connection can be used either with two posts, three posts or even more posts simply by providing a strap which is sufficient in length to accommodate the maximum number of posts and then by tensioning the strap down to the required length if a smaller number of posts is involved.

3. In the arrangements shown in FIG. 4 and 5, the posts do not need to be connected at the same height since the post 16 of the panel 11 can be arranged at different heights relative to the post 17. This arrangement can accommodate uneven ground or stepped ground where it is required to step the fence panels upwardly or downwardly in a particular direction.

For the first time, therefore, the present invention is provided a system which enables the fencing to be sufficiently flexible to accommodate damaging impact while maintaining the panel substantially in conventional form and thus manufactured in the conventionally cheap manner of the simply welded rails and posts.

Figure 6:
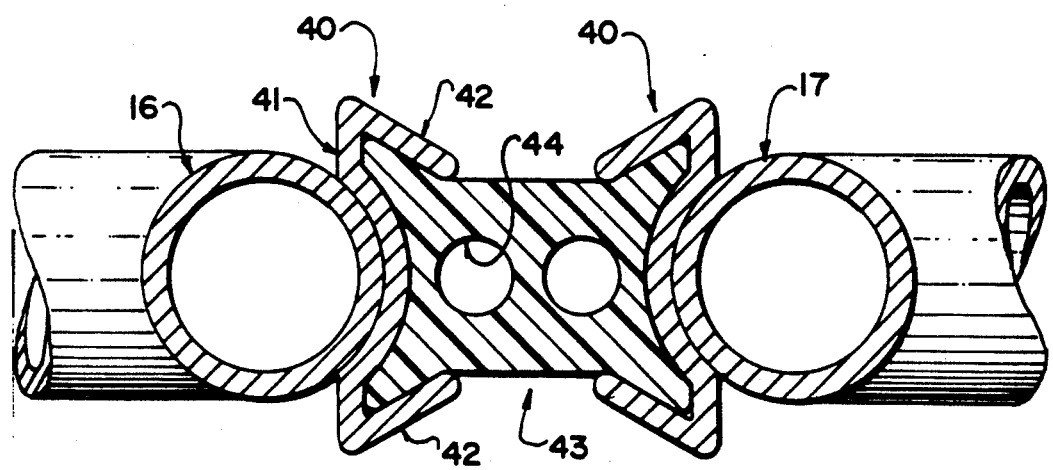
FIG. 6 is a cross sectional view similar to that of FIG. 3 showing a still further modified arrangement.
Figure 7:
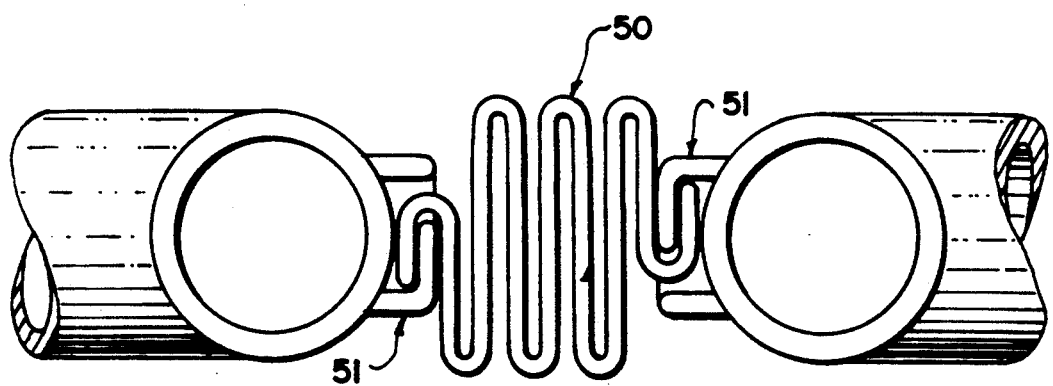
FIG. 7 is cross sectional view similar to that of FIG. 3 showing a yet further modified arrangement.

Turning now to FIGS. 6 and 7, alternative arrangements are shown for coupling between the posts 16 and 17. In the arrangement shown in FIG. 6, each post has a channel section 40 welded thereto on a face extending towards the opposed post. Each channel section includes a base plate 41 attached to the post and inwardly converging flanges 42 extending outwardly from the base plate 41. This forms a key way slot for receiving a flexible coupling block 43 formed of rubber or other suitable elastic material. The length of the channels 40 is sufficient to provide a coupling at the top and bottom of the panels respectively and the block is generally of similar shape and length to the channels. The posts can be connected simply by sliding longitudinally with the block being attached for example by adhesive to one of the channels and allowed to slide vertically downwardly into the other of the channels. The centre of the block includes holes 44 which allow flexing of the block in a shear direction to allow one of the posts to move in a direction generally at a right angles to a plane joining the post.

In FIG. 7 is shown a similar arrangement in which metal spring 50 is attached to flanges 51 on the post. The metal spring again is resilient and is convoluted form to allow movement of one post relative to the other post.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A fencing system for confining an animal comprising a plurality of fencing panels. each comprising an integral substantially rectangular rigid structure including a bottom, a top, a first end and a second end, means at the bottom for resting of the panel on the ground such that the top is supported at a height from the ground to confine the animal, means connecting one end of each panel to at least one next adjacent panel such that the panels are connected together with each providing support for the next to hold the panels vertical, said connecting means including a first elastic spring at an upper portion to the first end and a second elastic spring at a lower portion of the first end, each said first and second elastic springs having a first end attached to said one end and a second end attached to the adjacent panel, said elastic springs allowing flexible movement of said one end relative to said at least one next adjacent panel, wherein each of the first and second elastic springs comprises a block formed of an elastic material having one end face of the block attached to the first end and a second end face of the block attached to the next adjacent panel.

2. The fencing system according to claim 1 wherein the connecting means allows a degree of flexible movement upon impact with the panel by an animal sufficient to prevent damage to the panel by the impact while maintaining the panel and the next adjacent panel substantially vertical.

3. The fencing system according to claim 1 wherein the connecting means is arranged to elastically return the panel to the vertical position.

4. The fencing system according to claim 1 wherein the fencing panel comprises a first end post at the first end, a second end post at the second end and a plurality of parallel cross rails connecting the end posts and extending at right angles thereto.

5. A fencing system for confining an animal comprising a plurality of fencing panels, each comprising an integral substantially rectangular rigid structure including a bottom, a top, a first end and a second end, a first end post at the first end, a second end post at the second end and a plurality of parallel cross rails connecting the end posts and extending at right angles thereto, means at the bottom for resting of the panel on the ground such that the top is supported at a height from the ground to confine the animal, means connecting one end of each panel to at least one next adjacent panel such that the panels are connected together with each providing a support for the next to hold the panels vertical, said connecting means including a first elastic spring at an upper portion of the first end and a second elastic spring at a lower portion of the first end, said elastic spring allowing flexible movement of said end relative to said at least one next adjacent panel, each of said elastic springs comprising a flexible elastic band having a first free end attached to one of the fence panels, an intermediate portion wrapped around adjacent end posts of two of the panels and a second free end attached to one of the fence panels and including adjustable means on the one fence panel arranged for adjusting the position of the second end thereon.

6. The fencing system according to claim 5 wherein the flexible elastic band allows a degree of flexible movement upon impact with the panel by an animal sufficient to prevent damage to the panel by the impact while maintaining the panel and the next adjacent panel substantially vertical.

7. The fencing system according to claim 5 wherein the flexible elastic band is arranged to elastically return the panel to the vertical position.

8. The fencing system according to claim 5 wherein the attachment means attaching the first end is fixed and the adjustable attachment means at the second end are mounted on horizontal cross rails of one of the panels and on a next adjacent panel respectively.

9. The fencing system according to claim 5 wherein the adjustable attachment means comprises latch means operable to pinch the flexible band and movable to release the flexible band to move in a tensioning direction and to return to a pinched position to hold the flexible band against movement in a released direction.

10. The fencing system according to claim 9 wherein the adjustable attachment means comprises at least one pivotal quadrant.

11. The fencing system according to claim 5 wherein the flexible band is wrapped around end posts of the panel, the next adjacent panel and a third panel to hold the end post of the panel, next adjacent panel and third panel in parallel abutting position.

12. The fencing system according to claim 5 wherein the flexible elastic band is wrapped around the posts in figure of eight shape so as to pass between the posts to hold the posts in spaced position.

13. A method for confining a farm animal comprising providing a plurality of fencing panels each comprising an integral substantially rectangular rigid structure including a bottom of a top, a first end and a second end and means at the bottom for resting of the panel on the ground such that the top is supported at a height from the ground to confine the animal, connecting one end of each panel to at least one next adjacent panel, such that the panels are connected together with each providing support for the next to hold the panels vertical, with an elastically deformable element allowing flexible movement of said end relative to said at least one next adjacent panel, causing the elastically deformable element to allow a degree of flexible movement, upon impact with the panel by the farm animal, sufficient to prevent damage to the panel by the impact, causing the elastically deformable element to maintain the panel and the next adjacent panel substantially vertical during the impact to keep the farm animal confined, and causing the elastically deformable element to elastically return the panel to the vertical position after the impact.

14. The method according to claim 13 including providing a first elastically deformable element arranged at an upper portion of the first end and the second elastically deformable element arranged at a lower portion of the first end.

15. The method according to claim 14 wherein each of the first and second elements comprises a convoluted metal spring.

16. The fencing system according to claim 13 wherein the connecting means includes a portion thereof positioned between the end and the next adjacent panel and holding the end spaced from a contact with the next adjacent panel.

* * * * *